United States Patent [19]

Bossa

[11] Patent Number: 5,016,873
[45] Date of Patent: May 21, 1991

[54] PLAYSWING ASSEMBLY

[76] Inventor: David W. Bossa, 5 Spruce St., Braintree, Mass. 02184

[21] Appl. No.: 465,755

[22] Filed: Jan. 16, 1990

[51] Int. Cl.⁵ .......................................... A63G 33/00
[52] U.S. Cl. .................................... 272/85; 403/217; 403/403; 248/163.2
[58] Field of Search ................... 272/85, 113, 63, 62; 403/403, 217, 232.1, 219; 248/163.2, 165

[56] References Cited

U.S. PATENT DOCUMENTS

| | | | |
|---|---|---|---|
| 690,150 | 12/1901 | Inman | 248/163.2 X |
| 1,780,579 | 11/1930 | Crowley | |
| 1,932,959 | 10/1933 | Dennan | 248/165 X |
| 2,151,403 | 3/1939 | Burke | 272/85 |
| 2,413,362 | 12/1946 | Maxwell et al. | |
| 3,195,845 | 7/1965 | Conti | 248/163.2 |
| 4,192,406 | 3/1980 | Mitchell | |
| 4,390,081 | 6/1983 | Olmsted | |
| 4,498,801 | 2/1985 | Gilb | |

*Primary Examiner*—Richard E. Chilcot, Jr.
*Attorney, Agent, or Firm*—Donald N. Halgren

[57] ABSTRACT

A swing set assembly comprising a horizontal beam supported by a plurality of heavy leg timbers. Each leg timber is secured to the horizontal beam by a formed quadrilateral plate which eliminates any diagonal cutting of the leg timbers and permits easy assembly of the swings.

12 Claims, 2 Drawing Sheets

PLAYSWING ASSEMBLY

BACKGROUND OF THE INVENTION

1. Field of the Invention

This invention relates to swing sets and more particularly to bracket assemblies utilized to construct swing sets.

2. Prior Art

Swing sets are typically made of steel pipe or wood. They also typically are left outside year round, left to weather. The pipe swing sets rust very quickly. Wooden swing sets look much better than the steel swing sets, and they also last much longer.

However, the wooden swing sets are also typically very expensive to buy and can require a carpenter to assemble. The legs of the wooden swing sets should preferably be constructed from 4"×4"s. Brackets utilized to construct wooden truss assemblies, such as swing sets, should be simple to manufacture, and to provide ease of assembly, of the wooden components of the truss or swing set.

One such bracket or connector is shown in U.S. Pat. No. 4,498,801 to Gilb. The connector is complicated to make and the connector requires the members to which it attaches, to be diagonally cut.

U.S. Pat. No. 2,413,362 shows a metallic clip for reinforcing joints which has multiple direction bends which make the clip relatively more complicated to manufacture, and would not lend itself to swing set assembly.

U.S. Pat. No. 1,780,579 shows a truss brace which has many complicated cuts and bends. This brace also requires its associated legs to be carefully trimmed with diagonal cuts.

U.S. Pat. No. 4,192,406 shows a connector brace for a sawhorse which requires multiple forming operations as well as multiple cutting operations. This brace necessitates extremely complicated manufacturing.

U.S. Pat. No. 4,390,081 discloses a truss assembly utilizing trimmed trapezoidal wooden support brackets and trimmed legs. This type of construction is expensive to manufacture, even though the final assembly of the kit shown, would be relatively simple.

It is an object of the present invention to provide a bracket construction which itself is simple to manufacture and which permits its associated wooden assembly, such as a wooden swing set, to be assembled without the need for difficult diagonal cuts.

It is a further object of the present invention to provide a bracket which can be economical in material usage.

BRIEF SUMMARY OF THE INVENTION

The present invention comprises a swing set assembly kit which is adapted for home construction with a minimum of difficulty. The swing set assembly kit includes a horizontal beam and a plurality of legs. The legs are typically four inch by four inch timbers, which are attachable at their upper ends, to the horizontal beam. The leg timbers are cut straight across, not at any diagonal cuts, which are difficult to do because of the thickness of them, without a power saw, and which cuts must first be done from one side, then the timber turned so that the other side can be cut into to complete the cut.

The leg timbers are secured to the horizontal support beam by a plurality of angle braces. Each angle brace is formed from a quadrilateral plate of metal having a pair of parallel long sides and a pair of non-parallel short sides.

The quadrilateral plate has a first long side and a second long side almost the length of the first long side. A third short side is disposed diagonally between the corresponding ends of the first and second long sides, and a fourth short side is disposed perpendicularly between the corresponding other ends of the first and second long sides. The quadrilateral plate is formed with two bends in it. A first bend extends approximately from the mid-point of the second long side, parallel to the third short side, and across to the first long side. The first bend is a fold of 135 degrees across the bend.

A second bend extends approximately adjacent the first bend at the second long side, at an angle of about 41 degrees from the first bend, diagonally across the quadrilateral plate, to the opposed first long side. The second bend is a fold of about 135 degrees across the bend.

The quadrilateral plate with the two bends, each angled apart from one another, define three planar surfaces. The first planar surface is a parallelogram which is mated against a surface of a leg timber. The third planar surface is a generally triangular shaped portion which is mated against a surface of the horizontal support beam. The second planar surface, which spans between the first and third planar surfaces, is generally triangularly shaped and provides the bridging between the leg timber and the horizontal support beam.

Each bend has a reinforcing fillet disposed at several locations thereacross. The fillets provide a reinforcement along each bend to minimize flexure thereat.

The first and third planar surfaces S1 and S3 have orificii for emplacement of lag bolts or screws therethrough to permit the plate to be secured to the leg timbers and the horizontal support beam. The middle or second planar surface, of generally triangular configuration defines the element which holds the leg juxtaposed with respect to the horizontal beam.

The invention therefore comprises a swing assembly including a horizontal beam, an arrangement of leg timbers, a quadrilateral plate arrangement for securing each of said leg timbers to said horizontal beam to preclude the necessity for any diagonal cuts across said timbers which also weakens the timber, and to permit simple backyard assembly.

The quadrilateral plate comprises a four sided plate having two parallel sides and two non-parallel sides, the plate having at least two bends disposed diagonally thereacross. Each bend having a reinforcing means in the form of a fillet formed thereacross. The bends meet at one common parallel side to form a combined folded angle of about 90 degrees thereat, the bends diverge and intersect the other parallel edge of the plate, each defining a fold of about 135 degrees thereacross.

BRIEF DESCRIPTION OF THE DRAWINGS

The objects and advantages of the present invention will become more apparent when viewed in conjunction with the following drawings, in which.

DESCRIPTION OF THE PREFERRED EMBODIMENT

Figure 1:
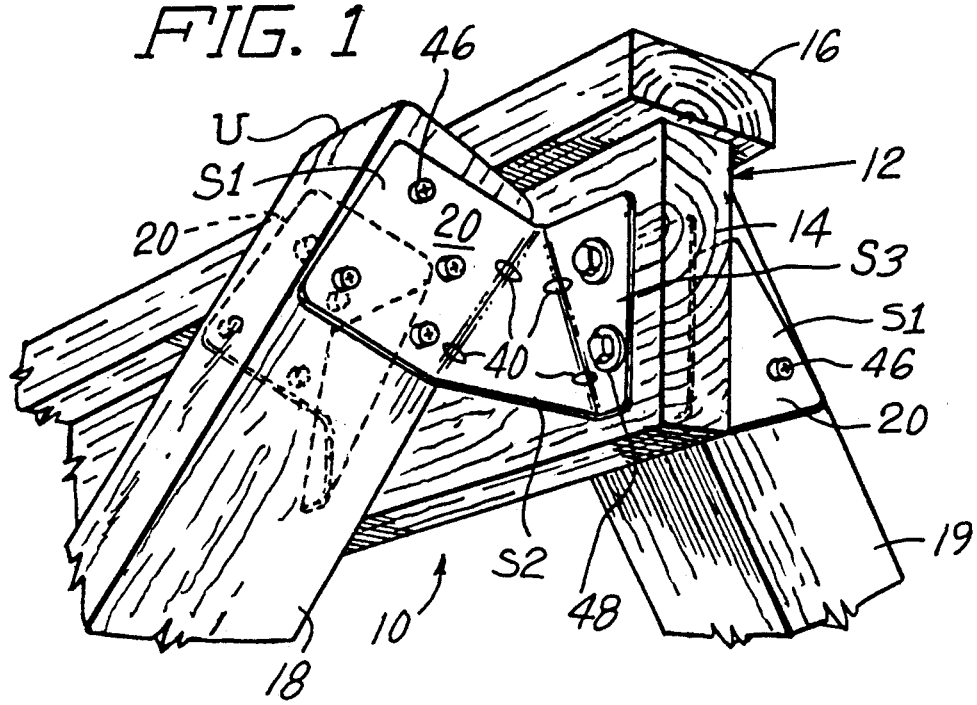
FIG. 1 is a perspective view of a portion of a swing assembly showing a pair of leg timbers secured by an arrangement of support plates, to a horizontal beam.

Referring to the drawings in detail, and particularly to FIG. 1, there is shown a swing set assembly kit 10 having a horizontal beam 12 comprising an edge beam 14 and a cap beam 16 secured together, in an edge to side manner. The horizontal beam 12 has a plurality of leg timbers 18 and 19 angularly secured thereto. Each leg timber 18 and 19 (only two shown in FIG. 1) is preferably constructed from four inch by four inch timbers.

Each leg timber 18 and 19 has an upper end U which is cut straight across, that is, normal or perpendicular to the longitudinal axis of the leg timber, or at least, having no special diagonal or angle cut required so that the leg need not be touching the beam 12. This is permitted because of the configuration of the angle support braces 20, which holds the leg timbers 18 and 19 to the horizontal beam 12.

Figure 2:
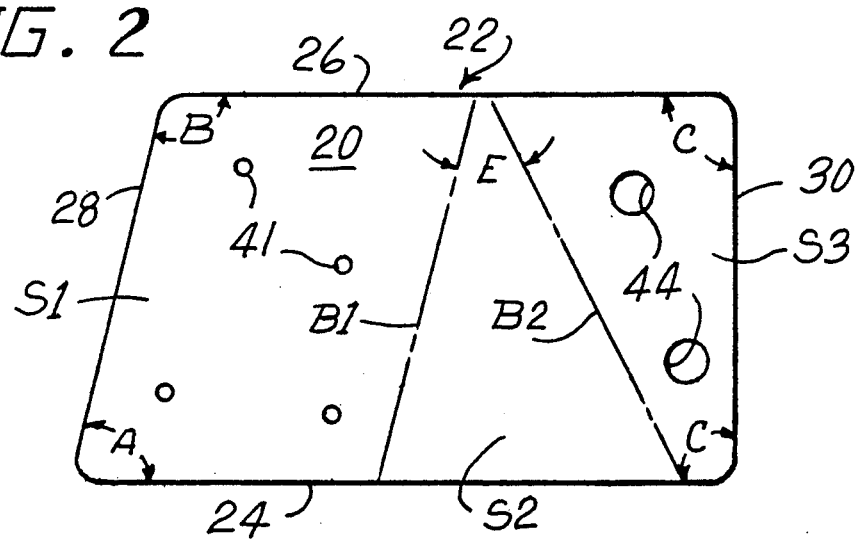
FIG. 2 is a planar view of a quadrilatoral support plate, prior to its being formed.

The support braces 20 are made from a quadrilateral plate 22, as shown in FIG. 2, having a pair of parallel long sides comprising a first side 24 and a second long side 26 almost the length of the first long side 24. A third short side 28 is disposed diagonally between the corresponding ends of the first and second long sides 24 and 26. A fourth short side 30 is disposed perpendicularly between the corresponding other ends of the first and second long sides 24 and 26. The angle "A" between the first long side 24 and the third short side 28 is acute, and the angle "B" between the second long side 26 and the third short side 28 is obtuse. The angles "C" between the fourth short side 30 and the first and second long sides 24 and 26, are generally preferably about ninety degrees.

Figure 3:
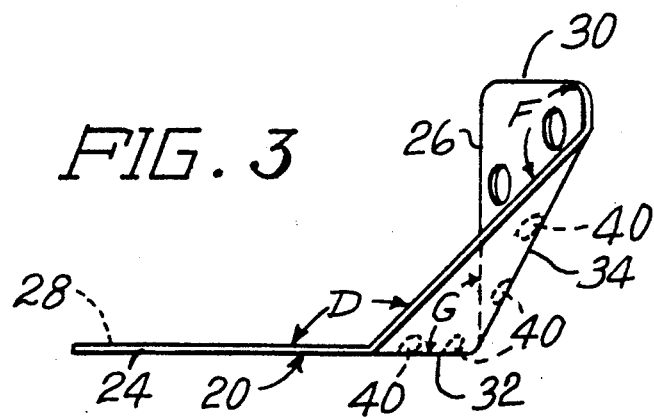
FIG. 3 is a side elevational view of a support plate in its formed configuration.

The quadrilateral plate 22 is formed by known means, with a first and a second bend 32 and 34 disposed diagonally between the first and second long sides 24 and 26, as shown by dashed lines B1 and B2 in FIG. 2, the bends being shown more appropriately, in FIG. 3.

The first bend B1 extends approximately from the midpoint of the second long side 26, and is generally parallel to the third short side 28, and across to intersect the first long side 24. The first bend 32 is a fold "D" of about 135 degrees, as may be seen in FIG. 3.

The second bend 34 extends from approximately adjacent the first bend 32 in the second long side 26 at an angle "E" of about 40 degrees from the first bend 32, (the locations of the bends being shown in the planar manner as B1 and B2 in FIG. 2), to the opposite edge or first long side 24, across the quadrilateral plate 22. The second bend 34 is a fold "F" of about 135 degrees, as may be seen in FIG. 3.

The quadrilateral plate 22 with the two bends 32 and 34 each angled apart from one another so as to generally intersect at the second long side 26, define three planar surfaces S1, S2 and S3.

The first planar surface S1 is generally a parallelogram, defined by the third short side 28, approximately one-half of the second long side 26 and less than one-half of the first long side 24, and the first bend 32.

The third planar surface S3 is a generally triangularly shaped portion, defined by the fourth short side 30, the remaining approximately one-half of the second long side 26, and the second bend 34.

The second planar surface S2 spans the portion of the quadrilateral plate 22, between the first and third planar surfaces S1 and S3.

Each bend 32 and 34 has a plurality of reinforcing means, such as a fillet 40, formed concurrently with the bending operation and arranged thereacross, as shown in FIGS. 1 and 3. The fillets 40 provide reinforcement across each bend 32 and 34 between the first and second planar surfaces S1 and S2, and between the second and third planar surfaces S2 and S3. The folds about the bend lines and the reinforcing fillets are all arranged in the same direction, so as to be produced with only one strike of a die, not shown.

It is to be noted that the reinforcing fillets 40 could however, be weldment beads disposed thereacross, but are preferably formed during the bending operation, to provide the further reinforcement thereto.

The particular quadrilaterial shape of each plate 20 permits them to be made by a "ganging" operation from a 4 inch strip stock, with left and right handed configurations of the plate 20 being spaced alternately. The plate 20 shown facing the viewer in FIG. 1 may be called a right hand plate. In the ganging operation, side 28 of a right hand plate would be "cut" at the same time and would in effect be the diagonal side 28 of a left hand plate. The plate 20 shown on the other side of leg timber 18 in phantom, may be called a left hand plate.

The "perpendicular" side 30 on either a left or right handed plate 20 permits easy alignment with the horizontal beam 14. The "diagonal" side 28 on either a left or right handed plate 20 permits easy alignment with the edge of a leg timber. The fold 32 of the plate 20 permits easy alignment with the other edge of the leg timber to which it is attached. The left hand plate and the right hand plate are mirror images of each other.

The first and third planar surfaces S1 and S3 of each plate 20, either left handed or right handed, each have a plurality of orificii 42 and 44 through which securement means such as screws or lag bolts 46 and 48 are installed for securing the plate 20 to the legs 18 and 19 and to the horizontal beam 12.

Figure 4:
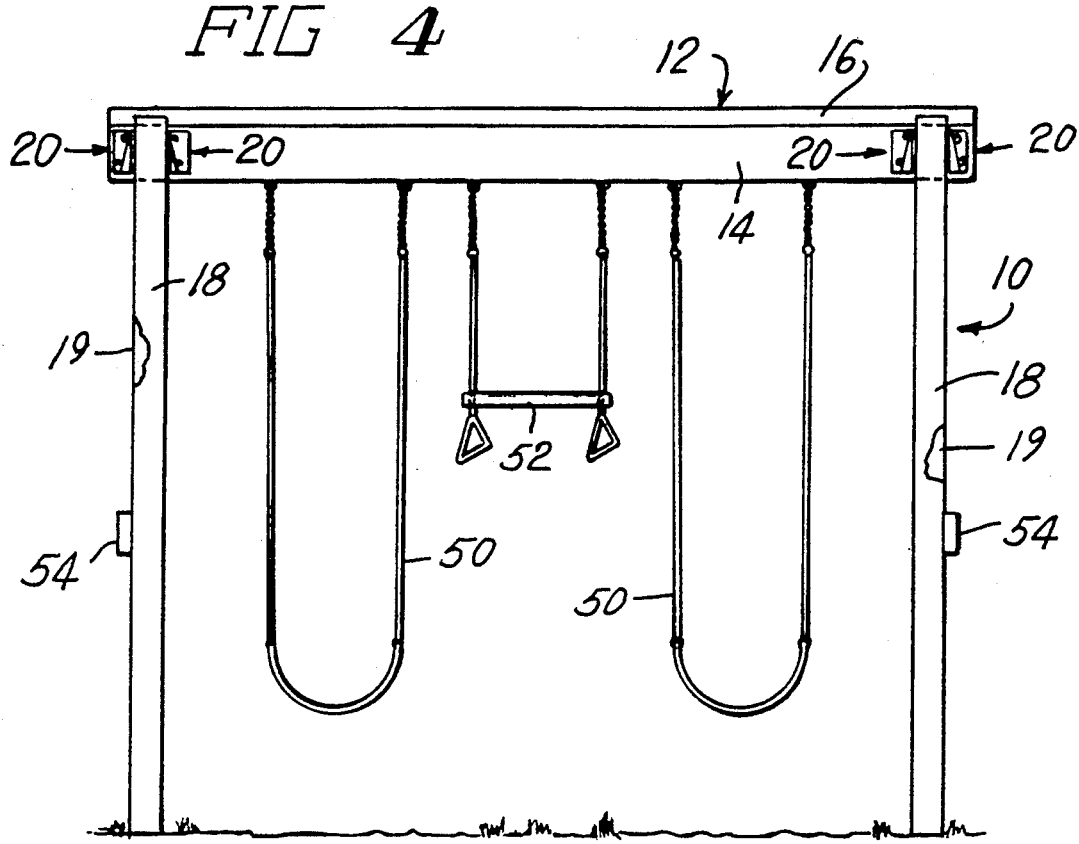
FIG. 4 is a side elevational view of a swing assembly constructed according to the principles of the present invention.
Figure 5:
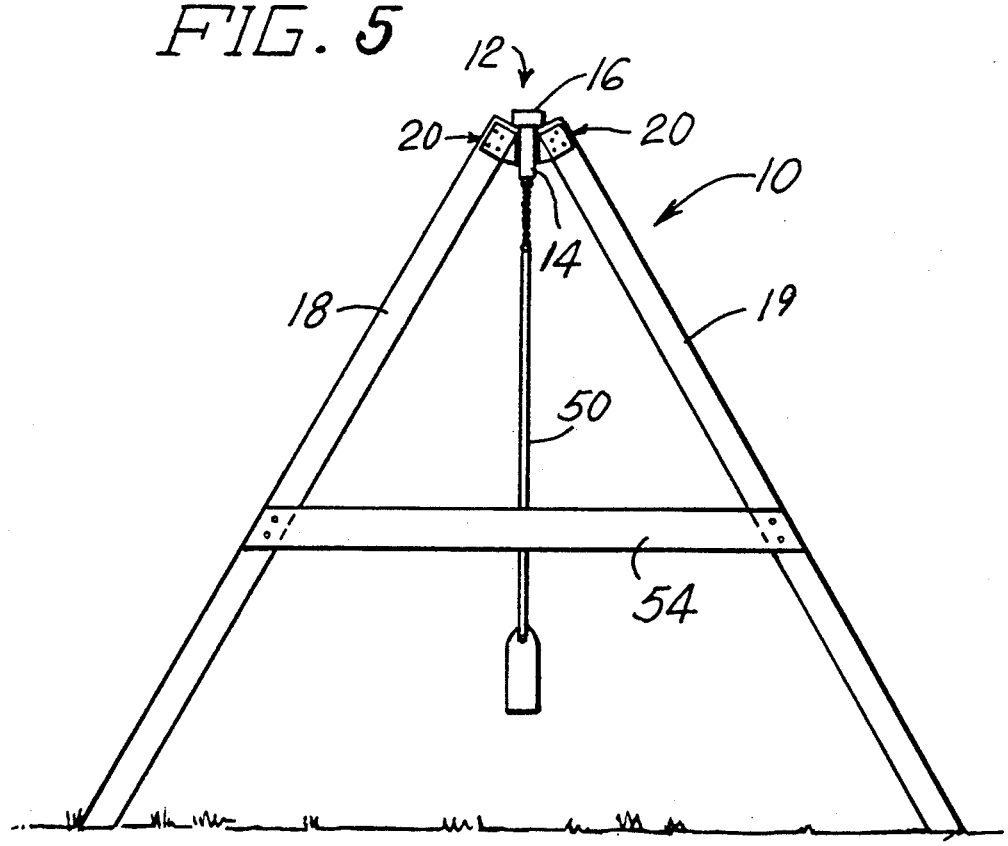
FIG. 5 is an end elevational view of a swing assembly constructed according to the principles of the present invention.

The swing assembly 10 is shown more generally in FIGS. 4 and 5, including a pair of swings 50 and a rail 52. The opposed leg timbers 18 and 19 are secured together by a horizontal bar 54, as best seen in FIG. 5.

Thus there has been shown a unique swing set assembly which may be purchased in kit form to permit a "do-it-yourselfer" to put it together without a lot of difficult timber cutting (sawing) procedures which is critical to this invention. The leg timbers are of necessity very heavy (at least 4"×4") to safely support several children at a time, their upper end strength also not being compromised by the reduced dimensions associated with a diagonal cut thereat. The formed quadrilateral plate with its unique shape, bends and reinforcing elements permits an inexpensive, simple way to manufacture the components and to build the children's swing set assembly with those components.

I claim:

1. A swing set assembly for supporting children safely in a swing arrangement comprising;
   a horizontal beam having two ends;
   a pair of leg timbers angularly attachable to each end of said horizontal beam;

an arrangement of support braces securable between each of said leg timbers and said horizontal beam, said support braces comprising a formed quadrilateral plate which permits said leg timbers to support said horizontal beam without said leg timbers requiring a diagonal cut at their upper ends, thus permitting full support of said horizontal beam;

said quadrilateral plate having a first bend and a second bend each formed diagonally thereacross to define three planar surfaces on said plate; and said first bend and said second bend each form angles of about 135 degrees between contiguous planar surfaces, both bends being formable together by a single strike of a die.

2. A swing set assembly as recited in claim 1 wherein said first bend and said second bend have a general point of intersection at one of said sides of said quadrilateral plate.

3. A swing set assembly as recited in claim 1 wherein a reinforcing means is disposed across at least one of said bends.

4. A swing set assembly as recited in claim 3, wherein said reinforcing means comprises a fillet formed thereacross.

5. A swing set assembly as recited in claim 4, wherein two of said planar surfaces have orificii therethrough for receipt of securement means to permit securement of said leg timbers to said horizontal beam.

6. A swing set assembly as recited in claim 5, wherein said horizontal beam is comprised of an edge beam and a cap beam secured theretogether, in an edge to side manner.

7. A support brace for securing a leg timber to a horizontal beam, without the requirement of non-orthogonal cutting of said leg timber, said support brace comprising:

a quadrilateral plate having a first long side and a second long side parallel thereto almost the length of the first long side, said plate having a third short side diagonally between corresponding ends of said parallel sides, and a fourth side disposed normally across the other ends of the long sides thus defining the periphery of said plate, said quadrilateral plate having a pair of bends disposed diagonally thereacross to form said support brace, said bends dividing said plate into three planar, spaced surface components; and said bends between said spaced surface components are each formed at an angle of about 135 degrees, both bends being formable together by a single strike of a die; and two of said planar surface components having means for attachment to said horizontal beam and one of said leg timbers.

8. A support brace as recited in claim 7, wherein each of said bends has a plurality of fillets formed thereacross to provide reinforcement between contiguous planar surfaces.

9. A support brace as recited in claim 8, wherein each plate is a left handed plate or a right hand plate, each being a mirror image of the other.

10. A swing set assembly kit for the backyard construction of a swing set, which utilizes heavy timbers, but does not require difficult diagonal cutting of said heavy timbers comprising:

a plurality of leg timbers;

a horizontal beam;

a pair of support braces for each heavy leg timber for securing said leg timbers to said horizontal beam;

said support braces each comprising a quadrilateral plate having a pair of bends formed diagonally thereacross to permit said heavy leg timbers to be secured to said horizontal beam without the need for any diagonal cuts therein which would reduce the strength of said legs timbers;

said horizontal beam comprising a cap beam and a side beam arrangable in a side to edge manner, said support brace having an angle of about 135 degrees across each bend;

both bends of each support brace being formed simultaneously with a single strike of a die.

11. A swing set assembly kit as recited in claim 10, wherein each bend has a reinforcing fillet disposed thereacross.

12. A swing set assembly kit as recited in claim 11, wherein each plate has a pair of short sides which are alignable with the horizontal beam and the leg timbers respectively to facilitate assembly thereof.

* * * * *